UNITED STATES PATENT OFFICE.

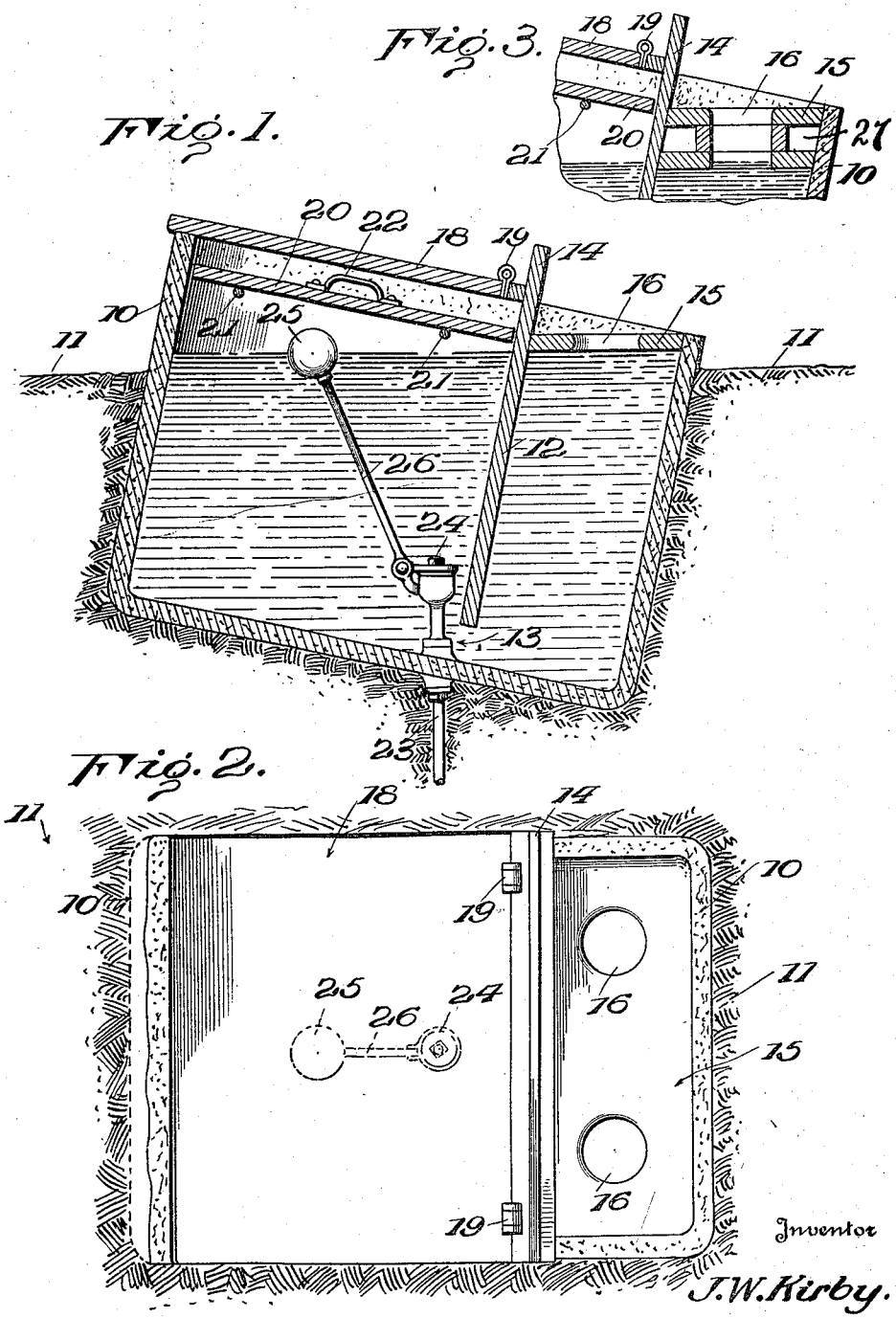

JAMES W. KIRBY, OF HARLAN, IOWA.

AUTOMATIC STOCK-WATERING TROUGH.

1,274,894.　　　　Specification of Letters Patent.　　Patented Aug. 6, 1918.

Application filed February 21, 1918. Serial No. 218,518.

*To all whom it may concern:*

Be it known that I, JAMES W. KIRBY, a citizen of the United States, residing at Harlan, in the county of Shelby and State of Iowa, have invented certain new and useful Improvements in Automatic Stock-Watering Troughs, of which the following is a specification.

This invention relates to automatic watering fountains for stock, more particularly hogs and cattle, and has for one of its objects to provide a simply constructed device whereby the level of the drinking water is uniformly maintained and the drinking water protected from contamination.

Another object of the invention is to provide a device of this character so constructed that the water is maintained at a temperature below the freezing point in cold weather.

With these and other objects in view, the invention consists in certain novel features of construction, as hereinafter shown and described and then specifically pointed out in the claims; and in the drawings illustrative of the preferred embodiment of the invention—

Figure 1 is a longitudinal sectional elevation of the improved device.

Fig. 2 is a plan view.

Fig. 3 is a sectional detail.

The improved device comprises a receptacle for the drinking water, preferably constructed of concrete or like material or compound, and represented as a whole at 10. The receptacle is preferably partially embedded in the ground, indicated at 11, and also preferably arranged in an inclined position, as shown, so that the water will flow toward one end of the receptacle. Disposed within the receptacle transversely thereof is a partition 12, preferably nearer the lower end of the receptacle than the higher end, the partition thus dividing the receptacle into a relatively large compartment and a relatively small compartment. At its lower edge the partition 12 is spaced from the bottom of the receptacle as shown at 13 and extends at its upper edge above the upper edge of the receptacle to form a guard, as hereafter explained.

The smaller compartment is provided with a closure 15 having a plurality of openings 16 through which the animals gain access to the drinking water, the latter standing normally as indicated by dotted lines. The closure 15 is disposed in a horizontal position as shown in Fig. 1, and the guard projection 14 defines the location of the openings, and prevents smaller animals from climbing upon the receptacle.

The larger compartment is likewise provided with an outer closure represented at 18 and preferably hinged at 19, to enable the closure 18 to be opened when required. Located within the larger receptacle and spaced below the outer closure 18 is an inner closure 20, detachably supported as by transverse rods 21, the rods likewise forming stays to support the sides of the receptacle.

The space between the outer closure 18 and the inner closure 20 serves as an air pack to prevent the freezing of the liquid within the receptacle.

The inner closure 20 is provided with a suitable lifting handle 22.

The receptacle is supplied with water through a conductor 23 leading into the receptacle and provided with a suitable controlling valve, indicated at 24, and provided with a suitable float 25 connected to the valve by a stem 26. By this simple arrangement the supply of water will be automatically cut off when it rises to a certain predetermined level or stage. Preferably the float valve will be so arranged as to maintain the water slightly above the lower line of the stationary closure 15, so that the drinking water is constantly maintained in convenient position for the animals.

The improved device may be constructed to supply drinking water to animals of different sizes but is designed more particularly for watering hogs and other relatively small sized animals. By providing the relatively restricted opening 16 waste and contamination is prevented, as only the mouths of the animals come in contact with the water.

The receptacle and the other parts may be of any required size or capacity and constructed of any material, but will preferably be of concrete or like compound.

In Fig. 3 another construction is shown consisting in forming the closure 15 double, or with a dead air space 27 therein surrounding the openings 16, to form an air cushion above the smaller compartment to protect the water therein and prevent freezing.

Having thus described the invention, what is claimed as new is:

1. A device of the class described comprising a receptacle, a transverse partition dividing the receptacle into compartments and spaced at its lower edge from the bottom of the receptacle and extending at its upper edge above the upper line of the receptacle, a closure for one of said compartments hingedly united to the receptacle and adapted to open against the extended portion of the partition, a stationary closure for the other of said compartments and having restricted openings providing access to the contents of the adjacent compartment.

2. A device of the class described comprising a receptacle, a transverse partition dividing the receptacle into compartments and spaced at its lower edge from the bottom of the receptacle, a detachable outer closure to one of said compartments, stay rods connecting the side walls of the receptacle above the normal water line thereof, an inner closure supported upon said rods and spaced from the outer closure, and a stationary closure for the other of said compartments and having restricted openings providing access to the contents of the adjacent compartment.

In testimony whereof I affix my signature.

JAMES W. KIRBY.

Copies of this patent may be obtained for five cents each, by addressing the "Commissioner of Patents, Washington, D. C."